UNITED STATES PATENT OFFICE.

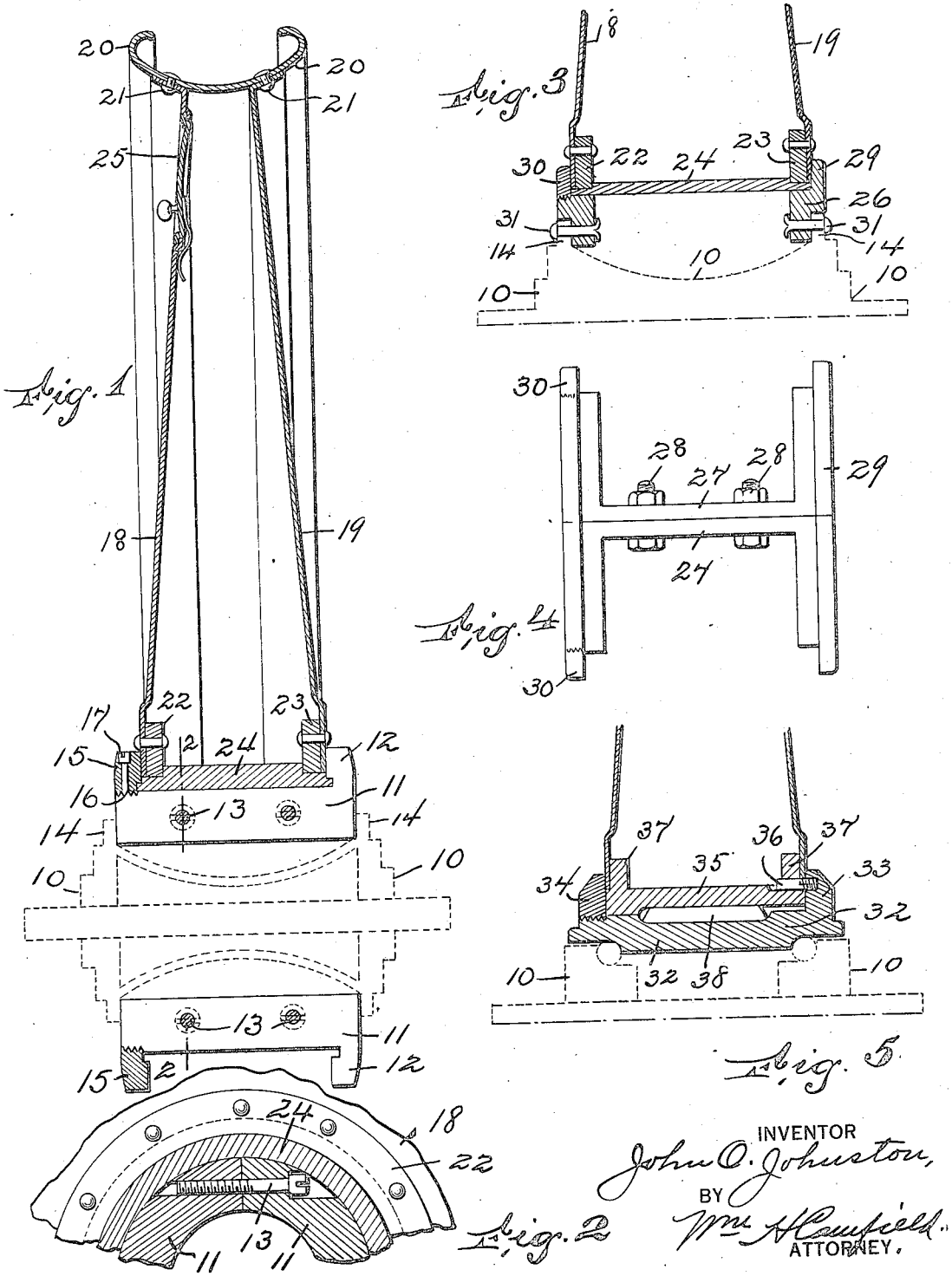

JOHN ODELL JOHNSTON, OF NEWARK, NEW JERSEY.

WHEEL.

1,386,784.  Specification of Letters Patent.  Patented Aug. 9, 1921.

Application filed June 18, 1920. Serial No. 389,835.

*To all whom it may concern:*

Be it known that I, JOHN O. JOHNSTON, a citizen of the United States, and a resident of Newark, county of Essex, and State of New Jersey, have invented certain new and useful Improvements in Wheels, of which the following is a specification.

This invention relates to an improved wheel, and is particularly adapted for disk wheels in which disks occupy the space formerly employed by spokes, so that a stronger wheel is provided with a comparatively smooth exterior.

The invention is particularly designed to provide disk wheels, the disk members of which can be attached to hubs specifically made to receive them, and can likewise be installed on the hubs of motorcycles, automobiles and the like, whereby that portion of the wheel beyond the hub can be replaced by the disk wheel herein set forth, in lieu of the spokes previously employed, so that old spoked wheels can be made over into disk wheels with but little expense and in a short time.

The invention is illustrated in the accompanying drawing, in which Figure 1 is a section of one form of my improved wheel, the hub proper of the wheel being shown in dotted outline, this form illustrating a type which can be attached to the hub of an ordinary spoked wheel of a motorcycle. Fig. 2 is a section on line 2—2 of the upper part of the hub of the wheel. Fig. 3 is a section of a modified form of construction, one-half of the hub proper being shown in dotted outline. Fig. 4 is an elevation of the form of hub member used in the construction shown in Fig. 3, and Fig. 5 is a section showing the improved wheel when employing a part of the hub proper as a portion of the hub member of the improved wheel.

In the drawing 10 indicates, in dotted outline, the hub proper of the wheel, that is, a hub as now employed in spoked wheels. In the form shown in Fig. 1 I place a hub member around this hub proper, the hub member consisting of a flanged part 11, the flange 12 thereof being located preferably at one end and the flanged part being separable, that is, split, usually into only two parts which are joined together by suitable means, such as the screws 13, so that the device can be installed in or removed from the hub proper 10 and can be seated between the flanges 14 of said hub proper, which flanges are the flanges that were formerly employed for securing the inner ends of the spokes.

The hub part also includes a flange 15 which is removable from the flanged part 11, usually by being screw-threaded, so that it can be screwed on the screw-threaded end of the flanged part 11, as shown at 16, and can be locked in place by any suitable means, such as the lock-screw 17.

The disk member comprises a pair of disks 18 and 19 which support the rim 20, which rim can be secured to the disks in any suitable manner, such as by brazing, welding or the like, but I illustrate the parts as secured together by the rivets 21, the inner ends of the disks being secured to the rings 22 and 23. The disks have a central opening and the rings are secured to the disks adjacent to said opening, said rings 22 and 23 being secured to a sleeve 24, which sleeve and the rings can be brazed, welded or otherwise secured together so that the disk member is a rigid, substantial structure.

The bore of the sleeve 24 is made to fit the outside of the flanged part 11, and when the flanged part 11 has been installed on the hub 10 of a wheel the disk member is slid on said flanged part and then the flange 15 is screwed in place, the flange 15 and the flanged part 11 thus forming a clamp in which the inner part of the disk member is securely held. The flanged part can not separate, as it will be noted in Fig. 2 that the sleeve, when in position, completely covers the screws 13 so that a separation of the sections that go to make up the flanged part can not take place.

The disks 18 and 19 are usually made of sheet steel and access is given to the inside thereof at one portion usually by any suitable form of door 25, so that the tire valve will be accessible.

In Figs. 3 and 4 I show a modified form in which the flanged part of the hub member is illustrated at 26 and consists of two sections having the cross-bars 27 secured together by means of the bolts 28, the two sections having a flange 29 on one end and the removable flange 30 on the other end, the flanged part 26 being secured to the spoke flanges 14 of the hub proper by rivets or pins 31 which are passed through the holes previously employed for fastening the spokes. The disk member shown in this construction is substantially the same as that shown in Fig. 1.

In Fig. 5 I show a modification showing how the device can be adapted for use in a hub made specifically therefor, the flanged part 32 being the outer member of the hub hub made specifically therefor, the flanged member not being necessarily separable since it is a part of the hub itself and is provided with the removable flange 34 which clamps the sleeve 35 in position on the flanged part 32.

The parts can be held against relative rotation where desired, by any suitable means, but I illustrate, in Fig. 5, a pin 36 which can be screw-threaded and thus fastened in the inner face of the flange 33, and the sleeve 35 having the end flanges 37 is provided with a hole in one of said flanges 37 to receive the pin 36. I also show in this figure means, such as a key 38, connecting the flanged part of the hub proper and the sleeve of the disk member against rotation relative to each other.

It will be understood that changes can be made in the shape and assembling of the parts without departing from the scope of the invention.

I claim:

1. A wheel comprising a hub member which includes an annular flanged clamp, a disk member including a pair of disks, a pair of rings to which the disks are secured, and a sleeve recessed at each end to receive a ring, said rings and sleeve being held in the clamp.

2. A wheel comprising a hub member which includes an annular flanged part and a removable flange to form a clamp, a disk member including a pair of disks, a pair of rings to which the disks are secured, and a sleeve to which the rings are secured, said rings and sleeve being held in the clamp.

3. A wheel comprising a hub member which includes a separable flanged part, means for securing the separable sections thereof together, a flange screwing on the flanged part and forming therewith a clamp, a disk member including a pair of disks, a pair of rings to which the disks are secured, and a sleeve, said rings and sleeve being held in the clamp, the sleeve inclosing the securing means of the sections and securing said means against unlocking.

4. A disk wheel comprising a hub member which includes a separable flanged part, the flange being located on one end thereof, means for securing the separable sections thereof together, a flange removably arranged on the other end of said flanged part, a disk member comprising a sleeve, a pair of rings secured adjacent to the opposite ends of the sleeve, a pair of disks with central openings therein and fitting over the sleeve and against the rings, the parts of the disk member being secured together and having the inner portion thereof, including the inner edges of the disks, secured between the flanges of the hub member, which hub member forms a clamp.

5. A disk wheel comprising a hub member having flanges on its ends, at least one of the flanges being removable so as to form a clamp, a disk member including a pair of disks, a pair of rings at the inner part of the disks, and a sleeve on which the rings rest, whereby the disks, the rings and the sleeve can be handled as a unitary structure which is constructed so as to be secured between the flanges of the hub member.

In testimony that I claim the foregoing, I have hereto set my hand, this 8th day of June, 1920.

JOHN ODELL JOHNSTON.